Aug. 18, 1959 J. H. LUCAS ET AL 2,900,572

ELECTRIC STORAGE AND DATA ROUTING APPARATUS

Filed Oct. 10, 1957 2 Sheets-Sheet 1

Inventors
JOHN H. LUCAS & KENNETH L. SMITH
By
Attorneys

Aug. 18, 1959 J. H. LUCAS ET AL 2,900,572

ELECTRIC STORAGE AND DATA ROUTING APPARATUS

Filed Oct. 10, 1957 2 Sheets-Sheet 2

Inventor
JOHN H. LUCAS & KENNETH L. SMITH
By
[signature]
Attorney

United States Patent Office 2,900,572

Patented Aug. 18, 1959

2,900,572

ELECTRIC STORAGE AND DATA ROUTING APPARATUS

John Harold Lucas, Caterham, and Kenneth Leslie Smith, Orpington, England, assignors to Powers-Samas Accounting Machines Limited, London, England, a British company Application October 10, 1957, Serial No. 689,277

Claims priority, application Great Britain November 9, 1956

4 Claims. (Cl. 315—84.5)

This invention relates to electric storage and data routing apparatus.

It has been proposed to effect the routing of data pulse trains from one set of lines to another set of lines with a matrix of electromagnetic relays which are selectively energised to set up a required pattern of connections between the sets of lines. Data pulse trains can then be routed from one set of lines to the other set of lines according to this pattern. Such a matrix cannot, however, operate at a high speed and if a large number of lines are involved the current consumption by the relays is high. Further, if electromagnetic relays are used in conjunction with electronic equipment the radiation from the contacts of the relays sometimes leads to incorrect operation of the electronic equipment.

It is an object of the present invention to provide an electric storage and data routing apparatus which has a low current consumption, which does not radiate sufficient energy to affect associated electronic equipment, is space-saving, and is relatively cheap to produce.

According to the invention there is provided an electric storage and data routing apparatus comprising cold-cathode gas-filled triodes arranged in columns and rows, a cathode load for each column, the load being connected to the cathode of each triode of the column appropriated to the load, a column-conditioning switch operable to condition the columns of triodes for triggering, a rectifier for each column connected with the load for the column and with said switch, said rectifiers each being arranged to provide a low resistance to current applicable to a cathode load through said switch, a selectively operable triode-triggering device having for each row a connection common to all trigger electrodes of the row and operable to trigger conditioned triodes of the row, and a pulse train generator having for each row a connection common to all anodes of the row and operable subsequent to operation of said triggering device to apply pulse trains to the anodes of said rows for transmission through triggered triodes and development as output pulse trains across cathode loads connected to triggered triodes.

Figure 1:
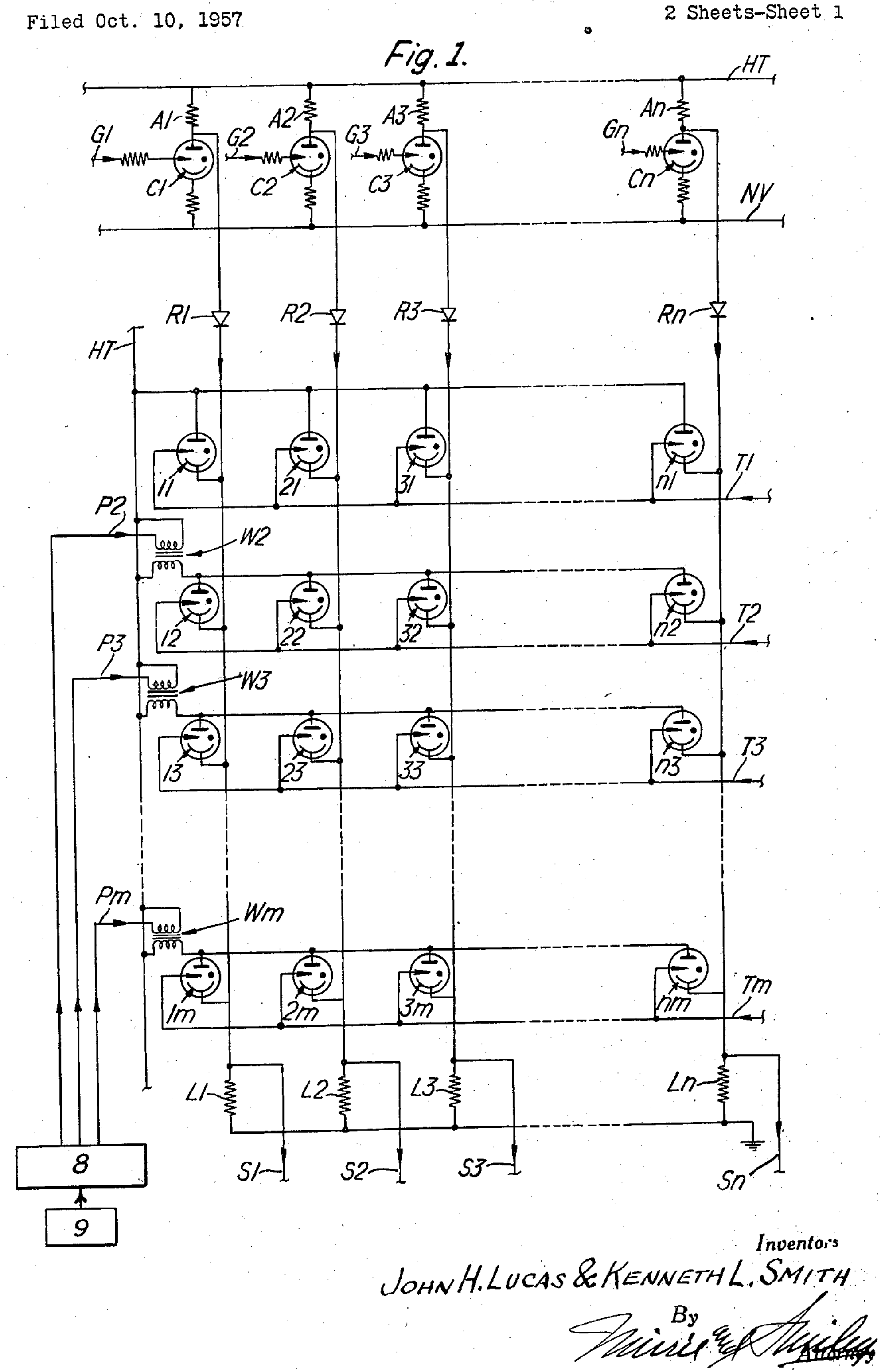
Figure 2:
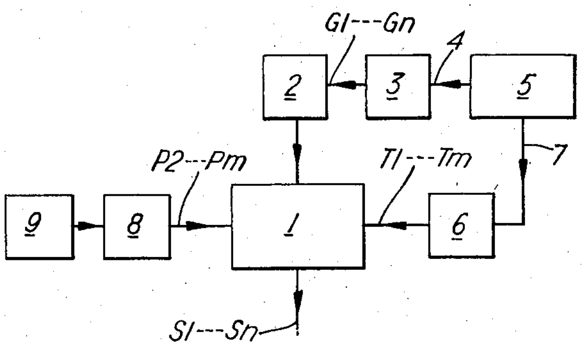
Figure 3:
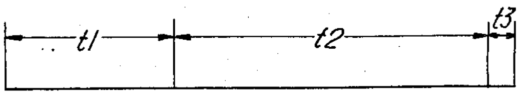

In order that the invention may be clearly understood some embodiments thereof will now be described, by way of example, with reference to the accompanying drawings in which:

Figure 1 is a circuit diagram of a storage and data routing matrix and a column-conditioning switch, Figure 2 is a schematic diagram of apparatus according to the invention, and Figure 3 is a timing diagram.

Referring to Figure 1 of the drawings, a storage and data routing matrix consists of *n* columns and *m* rows of cold-cathode gas-filled triodes. The first column consists of triodes 11, 12, 13, . . . 1*m*; the second column of triodes 21, 22, 23, . . . 2*m*; and the *n*th column of triodes *n*1, *n*2, *n*3, . . . *nm*. Similarly the first row consists of triodes 11, 21, 31, . . . *n*1, and the *m*th row of triodes 1*m*, 2*m*, 3*m*, . . . *nm*. A cathode load resistor L1 . . . L*n* is provided for each column of the matrix, and the cathodes of the triodes of each column are connected in common to the load resistor appropriate thereto. That is, the cathodes of triodes 11, 12, 13, . . . 1*m* are connected in common to the load resistor L1, and so on for all the load resistors L1, L2, L3, . . . L*n*. The load resistors are also all connected to earth, and output lines S1 to S*n* are respectively connected to the common cathode connection of the triodes of the columns 1 to *n*.

In the embodiment of the invention illustrated in Figure 1, a plurality of pulse transformers W2 to W*m* are provided, one for each of rows 2 to *m* of the matrix, and the anodes of the triodes of each of rows 2 to *m* are connected in common to one end of the secondary winding of the pulse transformer appropriated to that row. The other end of the secondary winding of each of the pulse transformers is connected to a voltage supply line HT. One end of the primary winding of each transformer is connected to the supply line HT and the other ends of the primary windings of the transformers W2 to W*m* are respectively connected to lines P2 to P*m*. The anodes of the triodes of the first row are connected in common to the voltage supply line HT. Lines T1 to T*m* are provided, one for each row, and are respectively connected to the trigger electrodes of each of rows 1 to *m* of the matrix, the trigger electrodes of the triodes of each row being connected in common.

A column-conditioning triode is provided for each column of the matrix, triode C1 for column 1, triode C2 for column 2 and so on, with triode C*n* for column *n*. The anodes of triodes C1 to C*n* are respectively connected through anode load resistors A1 to A*n* to a voltage supply line HT, and each anode is connected to a rectifier R1 to R*n* appropriate thereto, the rectifiers R1 to R*n* being also respectively connected to the common cathode connections of columns 1 to *n* of the matrix. Each of the rectifiers R1 to R*n* is connected so that it provides a low resistance to current applicable to the cathode load of the triodes of the column to which it is connected from the anode circuit of the column-conditioning triode appropriate to that column. The trigger electrodes of triodes C1 to C*n* are respectively connected to lines G1 to G*n*. The cathode of each of the triodes C1 to C*n* is connected through a resistor to a negative voltage supply line NV.

The operation of the apparatus will now be described with reference to the application thereof to a high speed electric stylus printer such, for example, as that described in United States patent specification No. 2,674,652.

Referring to Figure 2 of the drawings, the storage and data routing matrix, indicated generally by the reference 1, is connected as described above to column-conditioning triodes C1 to C*n* which together form a column-conditioning switch 2. Lines G1 to G*n*, Figures 1 and 2, which are connected to the trigger electrodes of the column-conditioning triodes, are also connected to a counter 3 which is operative to count pulses transmitted thereto on line 4 from a record card sensing device 5, of any suitable form, arranged to sense a card column-by-column, in any suitable known manner, and transmit data sensed from a record as electrical signals. One pulse is transmitted on to line 4 for each column sensed, and the data-representing electrical signals are transmitted to a triode-triggering device 6 on lines shown generically as line 7. The triode triggering device is a decoder of any suitable known kind which is operable to decode the data-representing electrical signals transmitted thereto, to raise the potential of one of lines T2 to T*m*, Figures 1 and 2, which connect the triggering device 6 to the matrix 1. Each line T2 to T*m* represents one decoded character only. The decoder is so constructed as to raise the potential of line T1, which is connected to the row . . . n1, Figure 1, when no-character is sensed from the record that is when, as the result of the sensing of a card column by the sensing device 5 no electrical signals are transmitted to the decoder from the sensing device. The purpose of this connection is described below.

The lines P2 to Pm, Figures 2 and 3, are connected through a timing switch 8 to a character-determining pulse train generator 9 which may be of the kind described in the aforesaid specification No. 2,674,652 and which is operable in synchronism with the main drive, not shown, of a machine of which the apparatus according to the invention forms a part, to generate character-determining pulse trains each for transmission to one row only of rows 2 to m of the matrix. Timing switch 8 is operated by a cam, not shown, driven, from the main drive of the machine. Each cycle of operation of the machine is divided into three time periods t1, t2 and t3, Figure 3, and the timing switch 8 is open during time periods t1 and t3 and is closed during time period t2 to apply the character-determining pulse trains one to each row of the matrix.

The output lines S1 to Sn, Figures 1 and 2, from the matrix 1 are each connected to a printing stylus appropriate thereto.

During the time period t1, Figure 3, a record card is, as stated above, sensed column-by-column and as each column of the card is sensed a signal is transmitted to the counter 3 on line 4, Figure 2, thereby to cause the counter 3 to trigger the triodes C1 to Cn of the column-conditioning switch 2 in succession. Accordingly as each column of the card is sensed, a column-conditioning triode is triggered to condition the triodes of a column of the matrix. As will be understood from the foregoing, in this embodiment of the invention a row of the matrix is provided for each character which can be printed in addition to the above-mentioned first row which is provided for the "no-transmission" condition when no character is sensed from the card. At about the same time as a column-conditioning triode is triggered, a triggering potential is applied to a row of triodes of the matrix on one of the lines T2 to Tm if a character is sensed from the column of the card, or if no character is sensed, a triggering potential is applied to the first row on line T1. The conditioned triode in the row of the matrix is triggered, and at the end of the time period t1, one triode in each column of the matrix will be conducting. Thus when data-representing signals are transmitted to the triggering device 6 the matrix will be caused to store an indication as to routes to be taken by character-determining pulse trains from the pulse train generator 9 on to the output lines S1 to Sn during the time period t2 when the switch 8 is closed.

When no character is sensed from a column of the card, the potential of line T1 is raised by the triode-triggering device 6, to trigger the conditioned triode in the first row of the matrix. None of the anodes of the triodes of this row are connected to the pulse train generator 9, and their function will be described below.

The styluses connected to the output lines S1 to Sn operate each to define a character on a moving web in the manner described in the aforesaid specification when a train of character-defining pulses is transmitted thereto during time period t2 through the matrix 1.

Consider, for example, that the stylus connected to line S1 is to print the character A sensed from the first column of a card, and a pulse train, defining this character is transmitted from the pulse train generator 9 on to line P2.

When the column-conditioning triodes are not triggered, their anode resistors A1 to An, which are connected to a supply voltage line HT, form with the cathode load resistors L1 to Ln potential dividers which maintain the potentials of the cathodes of the triodes of the matrix at a level such that any triggering potentials applied to their trigger electrodes will not trigger the triodes.

At the beginning of the time period t1, Figure 3, the first column of the card is sensed, and a signal transmitted to the counter 3 on line 4 causes the counter 3 to raise the potential of line G1. The potential of the trigger electrode of column-conditioning triode C1, Figure 1, is thus raised and triode C1 is triggered. The potential at its anode falls below earth potential due to the potential developed across the anode resistor A1, and the rectifier R1 is blocked in a non-conducting state. A conditioning potential difference therefore appears between the anode and cathode of each of the triodes 11 to 1m of the matrix. The data corresponding to the character A sensed from the card is transmitted to the triode-triggering device 6, Figure 2, which selects line T2 which is appropriate to the character A and raises the potential thereof. Since of the triodes of the matrix connected to the line T2, Figure 1, only triode 12 is conditioned, triode 12 alone is triggered. The current which then flows through the triode 12 also flows through the load resistor L1 which has a value such that the potential of the common cathode connection of the column now rises to a value sufficient to prevent the subsequent triggering of any other triode in the column. Column 1 of the matrix is now no longer conditioned, and even though the column-conditioning triode C1 remains conducting, triggering potentials applied on any of the lines T1 or T3 to Tm due to the sensing of others of the columns of the card will not trigger any of the triodes 11 or 13 to 1m of the matrix. During time period t2, switch 8 closes, and a train of pulses determining the character A is transmitted on line P2 through the transformer W2 to the anodes of the triodes of the second row of the matrix. Since triode 12 is conducting, and the potential difference between the anode and cathode of a conducting cold-cathode gas-filled triode is substantially constant, the potential of the cathode follows that of the anode, and a pulse train determining the character A is developed across the load resistor L1 for transmission to the stylus connected thereto by line S1. The supply voltages on lines HT and NV to the matrix and to the column-conditioning switch are switched off during time period t3, Figure 3, by a cam-operated switch, not shown, to reset the matrix and the column-conditioning switch for a further operation.

The first row of the matrix, consisting of triodes 11, 21, 31, . . . n1 is representative of a "no transmission" condition, and a triggering potential is applied to the trigger electrodes thereof on line T1 when no character is sensed from a column of the card. Consider, for example, that there is no character recorded in the second column of the card. When this column is sensed by the sensing device 5, Figure 2, column-conditioning triode C2 is triggered by a potential transmitted thereto on line G2 from the counter 3, and all the triodes 21 . . . 2m of the second column of the matrix are conditioned. Since no character is sensed from the second column of the card no data-representing signals are transmitted to the triode-triggering device 6, the potential of line T1 is raised by the triggering device 6, and triode 21 of the matrix is triggered. As stated above, as soon as any triode in a column is triggered, the remaining triodes in that column are no longer conditioned, and even though the conditioning triode C2 remains conducting until it is reset during time t3, none of the triodes 22 to 2m will be triggered when the remaining columns of the card are sensed. Since there is no connection from the pulse train generator 9 to triode 21, there will be no transmission of a pulse train through this triode in time period t2 and the stylus connected to line S2 will not be actuated.

If desired the apparatus described above may be modified to accommodate a condition in which every column of every card to be sensed has a character sensed therefrom; that is, data-representing electrical signals are transmitted to the triode triggering device 6 when each column of a card is sensed. The potential of one of the lines T2 to T*m* is raised as each column is sensed, and the "no transmission" condition referred to above with reference to the first embodiment of the invention does not occur. Accordingly when the apparatus is to accommodate this condition, the first row of triodes 11 . . . *n*1 and line T1 are omitted from the matrix described with reference to Figure 1, and line T1 is omitted from the apparatus described with reference to Figure 2.

This modified apparatus may be employed, for example, in an application in which no significant information is carried by a column of a card, and this condition is indicated by the transmission to the triggering device 6, as a result of the sensing of that column, of data signals representing a non-significant character such as an asterisk to be printed by a stylus to indicate that no significant data was sensed from that column.

Although the printing of a single character has been referred to above, it will be apparent that during the time period *t*1, the column-conditioning switch 2, Figure 2, and the triode-triggering device 6 are capable of *n* separate operations to store separately in the matrix described with reference to Figure 1 an indication of a different character or of no character, or to store separately in the modified matrix an indication of a character, each as the result of the sensing of a different column of a card, by triggering one triode in each column of the matrix. Character-determining pulse trains are applied simultaneously to each of the rows 2 to *m* of the matrix and are transmitted through the triggered triodes to develop output pulse trains across the load resistors connected to the triggered triodes.

A character sensed from a column of a card may be transmitted to a number of styluses if a plugboard is inserted between the counter 3, Figure 2, and the column-conditioning switch 2. With such an arrangement, when one of the lines G1 to G*n* is up in potential the plugboard connects this line, according to the pre-setting of the plugboard, to the trigger electrodes of a number of the column-conditioning triodes. The one line of the lines connecting the triggering device 6 to the matrix appropriate to the data-representing signals transmitted to the triggering device 6 is raised in potential by the triggering device 6, and a triode in each conditioned column of the matrix is triggered. The character-determining pulse train corresponding to the character sensed from the card is then developed across each of the load resistors connected to the triggered triodes of the matrix for transmission to the styluses.

We claim:

1. An electric storage and data routing apparatus comprising cold-cathode gas-filled triodes arranged in columns and rows, a cathode load being connected to the cathode of each triode of the column appropriated to the load, a column-conditioning switch operable to condition the columns of triodes for triggering, a rectifier for each column connected with the load for the column and with said switch, said rectifiers each being arranged to provide a low resistance to current applicable to a cathode load through said switch, a selectively operable triode-triggering device having for each row a connection common to all trigger electrodes of the row and operable to trigger conditioned triodes of the row, and a pulse train generator having for each row a connection common to all anodes of the row and operable subsequent to operation of said triggering device to apply pulse trains to the anodes of said rows for transmission through triggered triodes and development as output pulse trains across cathode loads connected to triggered triodes.

2. An electric storage and data routing apparatus comprising cold-cathode gas-filled triodes arranged in columns and rows, a cathode load for each column, the load being connected to the cathode of each triode of the column appropriated to the load, a column-conditioning switch operable to condition the columns of triodes for triggering, a rectifier for each column connected with the load for the column and with said switch, said rectifiers each being arranged to provide a low resistance to current applicable to a cathode load through said switch, a selectively operable triode-triggering device having for each row a connection common to all trigger electrodes of the row and operable to trigger conditioned triodes of the row, and a pulse train generator having for each row except one representative of a "no transmission" condition a connection common to all anodes of the row and operable subsequent to operation of said triggering device to apply pulse trains to the anodes of said rows for transmission through triggered triodes and development as output pulse trains across cathode loads connected to triggered triodes.

3. Apparatus according to claim 1, wherein the column-conditioning switch comprises for each column a cold-cathode gas-filled triode the anode of which is connected to the rectifier appropriate to the column, said column-conditioning triode being operable when triggered to prevent the flow of current through the rectifier.

4. Apparatus according to claim 2, wherein the column-conditioning switch comprises for each column a cold-cathode gas-filled triode the anode of which is connected to the rectifier appropriate to the column, said column-conditioning triode being operable when triggered to prevent the flow of current through the rectifier.

References Cited in the file of this patent

UNITED STATES PATENTS

| | | |
|---|---|---|
| 2,049,763 | De Forest | Aug. 4, 1936 |
| 2,136,441 | Karolus | Nov. 15, 1938 |
| 2,810,098 | Pearce et al. | Oct. 15, 1957 |
| 2,816,249 | Brightman | Dec. 10, 1957 |